United States Patent
Rottman et al.

(10) Patent No.: US 9,853,392 B2
(45) Date of Patent: Dec. 26, 2017

(54) CONNECTOR GUARD

(71) Applicant: Caterpillar Inc., Peoria, IL (US)

(72) Inventors: Joseph Lee Rottman, Decatur, IL (US); Justin Matthew Krager, Germantown Hills, IL (US); Michael Lee McWilliams, Arthur, IL (US)

(73) Assignee: Caterpiller Inc., Peoria, IL (US)

( * ) Notice: Subject to any disclaimer, the term of this patent is extended or adjusted under 35 U.S.C. 154(b) by 24 days.

(21) Appl. No.: 14/865,059

(22) Filed: Sep. 25, 2015

(65) Prior Publication Data
US 2017/0093084 A1   Mar. 30, 2017

(51) Int. Cl.
*B65D 6/28*       (2006.01)
*H01R 13/52*    (2006.01)

(52) U.S. Cl.
CPC ............................. *H01R 13/5213* (2013.01)

(58) Field of Classification Search
CPC ...... H01R 13/5213; H02G 3/14; H02G 3/081; H02G 3/08
USPC ............... 220/4.01, 4.02, 3.2–3.9, 3.92, 3.94; 206/701–728; 174/563, 562, 561, 560, 174/559, 520
See application file for complete search history.

(56) References Cited

U.S. PATENT DOCUMENTS

| | | |
|---|---|---|
| 3,899,326 A | 8/1975 | Frost et al. |
| 4,271,337 A * | 6/1981 | Barkas ............... H01R 13/7036 200/51.09 |
| 4,390,114 A * | 6/1983 | Sviatoslavsky ....... F21V 17/107 220/4.02 |
| 6,265,670 B1 | 7/2001 | Duesterhoeft et al. |
| 6,505,865 B2 | 1/2003 | Minemyer |
| 6,557,715 B2 * | 5/2003 | Ikeda ..................... H05K 9/006 220/4.02 |
| 7,053,297 B2 * | 5/2006 | Hull ....................... H02G 3/081 174/50 |
| 7,082,728 B1 * | 8/2006 | McConaughy ........ H02G 3/121 174/50 |
| 7,384,297 B2 | 6/2008 | King, Jr. et al. |
| 7,762,415 B2 | 7/2010 | Matsui |
| 8,162,686 B2 | 4/2012 | van Beveren et al. |

(Continued)

FOREIGN PATENT DOCUMENTS

| | | |
|---|---|---|
| DE | 202004014561 U1 | 12/2004 |
| DE | 20 2009 014 862 U1 | 5/2010 |

(Continued)

*Primary Examiner* — Kareen Thomas
(74) *Attorney, Agent, or Firm* — Finnegan, Henderson, Farabow, Garrett & Dunner LLP (57) ABSTRACT

A connector guard may include a first member having a planar base element. A planar end element may extend substantially perpendicularly from a first end of the planar base element. An end tab coextensive with the planar base element may protrude from a second end of the planar base element. Two planar side elements may extend substantially perpendicularly from the planar base element of the first member. The connector guard may include a second member having a planar base element. A planar end element may extend substantially perpendicularly from a first end of the planar base element of the second member. An end tab coextensive with the planar base element of the second member may protrude from a second end of the planar base element of the second member.

20 Claims, 5 Drawing Sheets

(56) References Cited

U.S. PATENT DOCUMENTS

| | | | |
|---|---|---|---|
| 8,808,039 B2 | 8/2014 | Mott et al. | |
| 2002/0154488 A1* | 10/2002 | Leopold | H01H 71/0207 |
| | | | 361/728 |
| 2003/0045145 A1* | 3/2003 | Mortun | H01R 13/703 |
| | | | 439/145 |
| 2012/0261409 A1* | 10/2012 | Teteak | H05K 5/0073 |
| | | | 220/4.02 |

FOREIGN PATENT DOCUMENTS

| | | | |
|---|---|---|---|
| EP | 1638383 A1 | 3/2006 | |
| GB | 2500027 A | 9/2013 | |
| WO | WO 2014/074245 A1 | 5/2014 | |

* cited by examiner

CONNECTOR GUARD

TECHNICAL FIELD

The present disclosure is directed to a connector guard and, more particularly, is directed to a connector guard assembly for protecting a connection.

BACKGROUND

Machines, such as excavators, material handling machines, mining machines, and other machines associated with working on or moving earth, rocks, debris, and/or other materials, may be equipped with various types of connections, such as electrical connections. Due to the environment in which such machines may operate, these types of connections may be exposed to abrasion, impact, and contamination. In addition, such machines often require servicing during which they may be exposed to high pressure jets of fluid. For example, high pressure water jets may be used to clean portions of the machines. During machine operation, the connections, for example electrical connections, may be damaged if not adequately protected. In addition, such connections may be damaged and/or contaminated by high pressure fluid jets employed, e.g., for cleaning, during machine servicing.

In order for a secure connection to be ensured, it would be beneficial and desirable to adequately protect connections, e.g., electrical connections, from damage and/or contamination during operation and during servicing. Given the field environment in which such machines may operate, it also would be desirable and beneficial to have a connector guard that is robust in terms of protective qualities, yet capable of being installed and serviced in the field without substantial difficulty and with as few parts as necessary. In addition, since these machines often include large numbers of electrical and other types of connections that need protection, a connector guard that is relatively inexpensive and easy to manufacture is desirable.

One type of connector is disclosed in U.S. Pat. No. 7,384,297 to King, Jr. et al. that issued on Jun. 10, 2008 (the '297 patent). Specifically, the '297 patent describes an open-face electrical connector characterized as permitting on-the-go securement and sealing of an electrical junction after an electrical connection has been formed. The electrical connector of the '297 patent is a clamshell type wire connector that comprises first and second mateable housings that form an enclosure for supporting an electrical wire therein. One of the housings includes first and second spaced latchable wire retainers. The latchable wire retainers include first and second jaws with wire support surfaces. Insulated portions of connected wires are held in the latchable wire retainers. One or both housings is/are intended to contain a viscous sealant that, when the housings are in closed, mating engagement, is said to form a waterproof connection.

The wire connector of the '297 patent has many disadvantages. For example, the structure of the connector of the '297 patent may be unduly complicated, resulting in substantial expense for its manufacture. The complicated structure of the latchable wire retainers may present significant challenges for reliably molding the connector. Also, the snap fasteners employed to lock the housings together in the '297 patent may not reliably withstand the high pressure water jets employed in cleaning operations in areas adjacent the connection. In addition, the use of a viscous sealant suggests the need for care in handling to prevent loss/spillage of the sealant until the connector is used, as well as while the connector is being applied to a connection. Further, in view of the fact that the connection may be essentially encased in the viscous sealant, it may be difficult to service the connection when needed in the field.

The connector guard of the present disclosure solves one or more of the problems set forth above and/or other problems of the prior art.

SUMMARY

In one aspect, the present disclosure is directed to a connector guard. The connector guard may include a first member having a planar base element, and a planar end element extending substantially perpendicularly from a first end of the planar base element. An end tab may be coextensive with the planar base element and protrude from a second end of the planar base element. Two planar side elements may extend substantially perpendicularly from the planar base element of the first member. The connector guard also may include a second member having a planar base element, and a planar end element extending substantially perpendicularly from a first end of the planar base element. An end tab may be coextensive with the planar base element and protrude from a second end of the planar base element of the second member.

In another aspect, the present disclosure is directed to a connector guard assembly. The connector guard assembly includes a first member having a first end and a second end. A T-shaped end tab may be at the first end of the first member. An end element may be at the second end of the first member. A rounded slot may be on the end element of the first member and two side elements may be substantially perpendicular to the end element. The connector guard also includes a second member having a first end and a second end. A T-shaped end tab may be at the first end of the second member. An end element may be at the second end of the second member. A rounded slot may be on the end element of the second member. The first member may be engaged with the second member, and the T-shaped end tab of the first member may be adjacent the rounded slot of the second member, and the T-shaped end tab of the second member may be adjacent the rounded slot of the first member.

In yet another aspect, the present disclosure is directed to a kit for a connector guard. The kit may include a first member, the first member having a planar base element with a length and a width, and having a T-shaped end tab at a first end. The first member also may include two substantially parallel side elements, each being substantially perpendicular to the planar base element, and each having a length substantially equal to the length of the planar base element. The first member also may include an end element at a second end of the planar base element, substantially perpendicular to the planar base element, and substantially perpendicular to each of the two substantially parallel side elements. The kit also may include a second member, the second member having a planar base element with a length and a width, and having a T-shaped end tab at a first end. The second member also may include an end element at a second end of the planar base element, the end element being substantially perpendicular to the planar base element.

DETAILED DESCRIPTION

Figure 1:
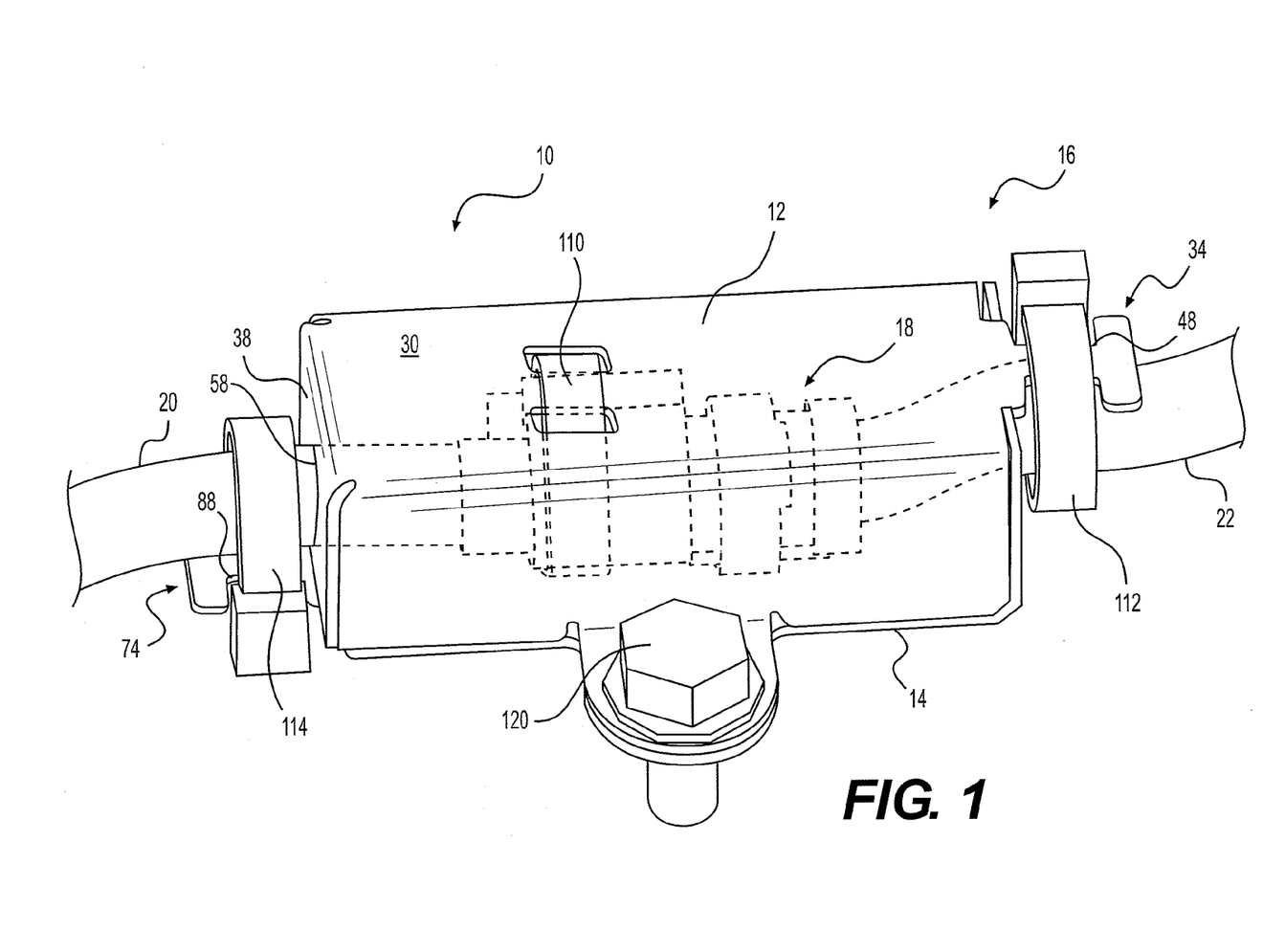
FIG. 1 is a perspective view illustration of an assembled exemplary connector guard.

FIG. 1 illustrates an exemplary connector guard 10 that is assembled to protect a connection, e.g., an electrical connection. Connector guard 10 includes a first member 12 and a second member 14 that, in an assembled condition and deployed around a connection, may be referred to as a connector guard assembly 16. In FIG. 1, connector guard 10 is illustrated deployed around a connection 18 (shown in dotted lines inside connector guard 10) that has been made between a first cable 20 and a second cable 22. The particular connector employed at connection 18 may be any of various connectors know in the art. First and second cables 20, 22 are for purposes of illustration only, and are merely representative of the various conductors, wires, cables, etc., that may be connected within connector guard 10. Connector guard assembly 16 may include various other components that will be described subsequently.

Figure 2:
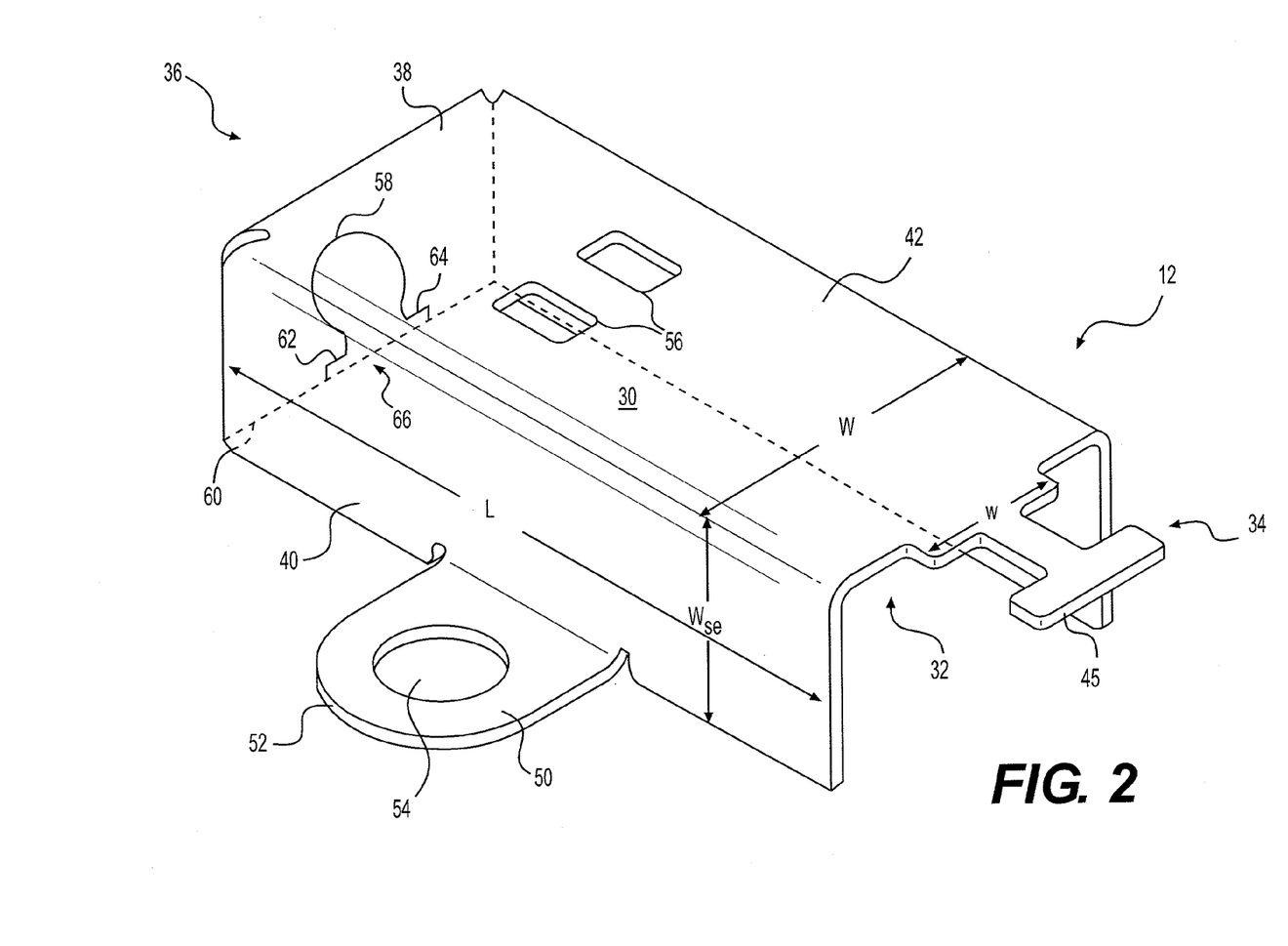
FIG. 2 is a perspective view of one component of an exemplary connector guard.

FIG. 2 is a perspective view of first member 12 that is shown deployed in assembly 16 of FIG. 1. Referring to FIG. 2, first member 12 includes a planar base element 30 that may be substantially rectangular in shape. At a first end 32 of planar base element 30, an end tab 34 may be coextensive with planar base element 30 and protrude from first end 32. End tab 34 also may be referred to as a T-shaped end tab. A second end 36 of planar base element 30 may include an end element 38. End element 38 may extend substantially perpendicularly from planar base element 30. First side element 40 and second side element 42 also may extend substantially perpendicularly from planar base element 30. Accordingly, the relationship among the several elements of first member 12 is that end element 38 and first and second side elements 40, 42 may be substantially perpendicular to planar base element 30, first and second side elements 40, 42 may be substantially parallel to each other, and end element 38 may be substantially perpendicular to first and second side elements 40, 42. The result may be a substantially rectangular partial enclosure that includes an open area opposite planar base element 30 and an open area opposite end element 38.

Figure 3:
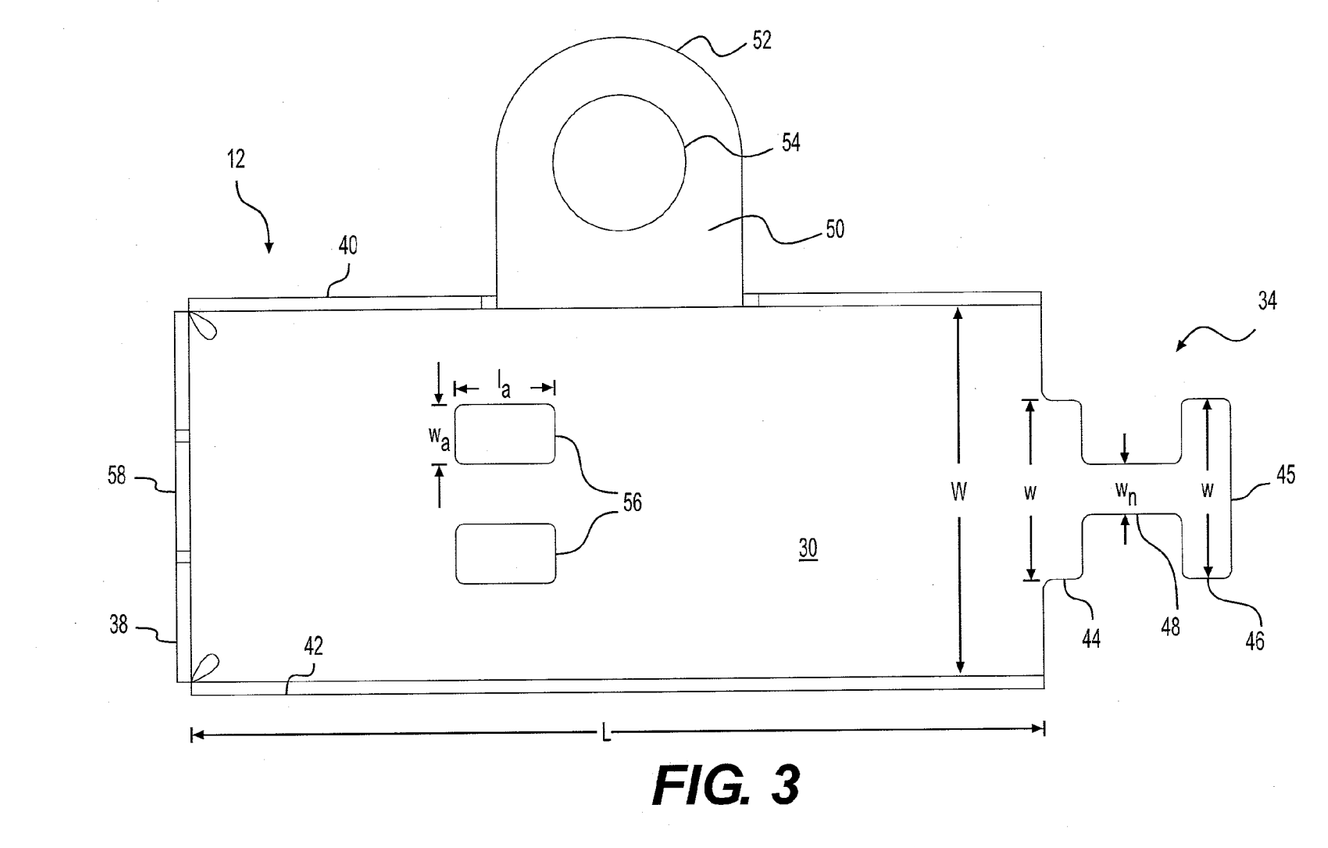
FIG. 3 is a bottom plan view of the component of FIG. 2.

Referring both to FIG. 2 and FIG. 3, T-shaped end tab 34 may have a particular shape or profile that includes several connected portions. For example, T-shaped end tab 34 may include a first portion 44 contiguous to planar base element 30 and having a first width w. T-shaped end tab 34 also may include an end portion 46, substantially equal in width w to first portion 44. T-shaped end tab 34 also may include a middle portion 48 between first portion 44 and end portion 46. Middle portion 48 may be narrower than first portion 44 and end portion 46. While T-shaped end tab 34 is generally shaped like a "T" as it extends to its terminal edge 45, it is contemplated that end tab 34 may be shaped somewhat less like the letter "T" and still conform to the shape or profile described.

First member 12 may include a side tab 50 laterally protruding substantially perpendicularly from an edge of one of first and second side elements 40, 42. For example, in the embodiment illustrated in FIGS. 2 and 3, side tab 50 laterally protrudes from an edge of first side element 40. Side tab 50 may include an outer edge 52, which may be rounded, for example, and may define an aperture 54 that extends therethrough. Side tab 50 may be located centrally relative to first side element 40. As a result, side tab 50 may be centered at a midpoint along the length L of planar base element 30. It is contemplated that, in some embodiments, side tab 50 may be centered somewhat offset from a midpoint along the length L of planar base element 30. As illustrated in FIGS. 2 and 3, side tab 50 may protrude from first side element 40 in a plane that is substantially parallel to a plane that includes planar base element 30.

First member 12 may include a plurality of apertures 56 defined by planar base element 30 and extending therethrough. For example, as illustrated in FIGS. 2 and 3, planar base element 30 may include two apertures 56. Apertures 56 may be substantially rectangular in shape and may be located adjacent each other and offset from a midpoint along the length L of planar base element 30. As illustrated in FIGS. 2 and 3, apertures 56 may be offset from a midpoint along the length L of planar base element 30 in a direction toward end element 38.

End element 38 of first member 12 may include a rounded slot 58. Rounded slot 58 may be substantially circular in profile, but it also may be elliptical, oval, or otherwise curved. Rounded slot 58 may be substantially centrally located on an edge 60 of end element 38. Relieved portions 62, 64 may be located on edge 60 and adjacent entrance 66 of rounded slot 58.

Figure 4:
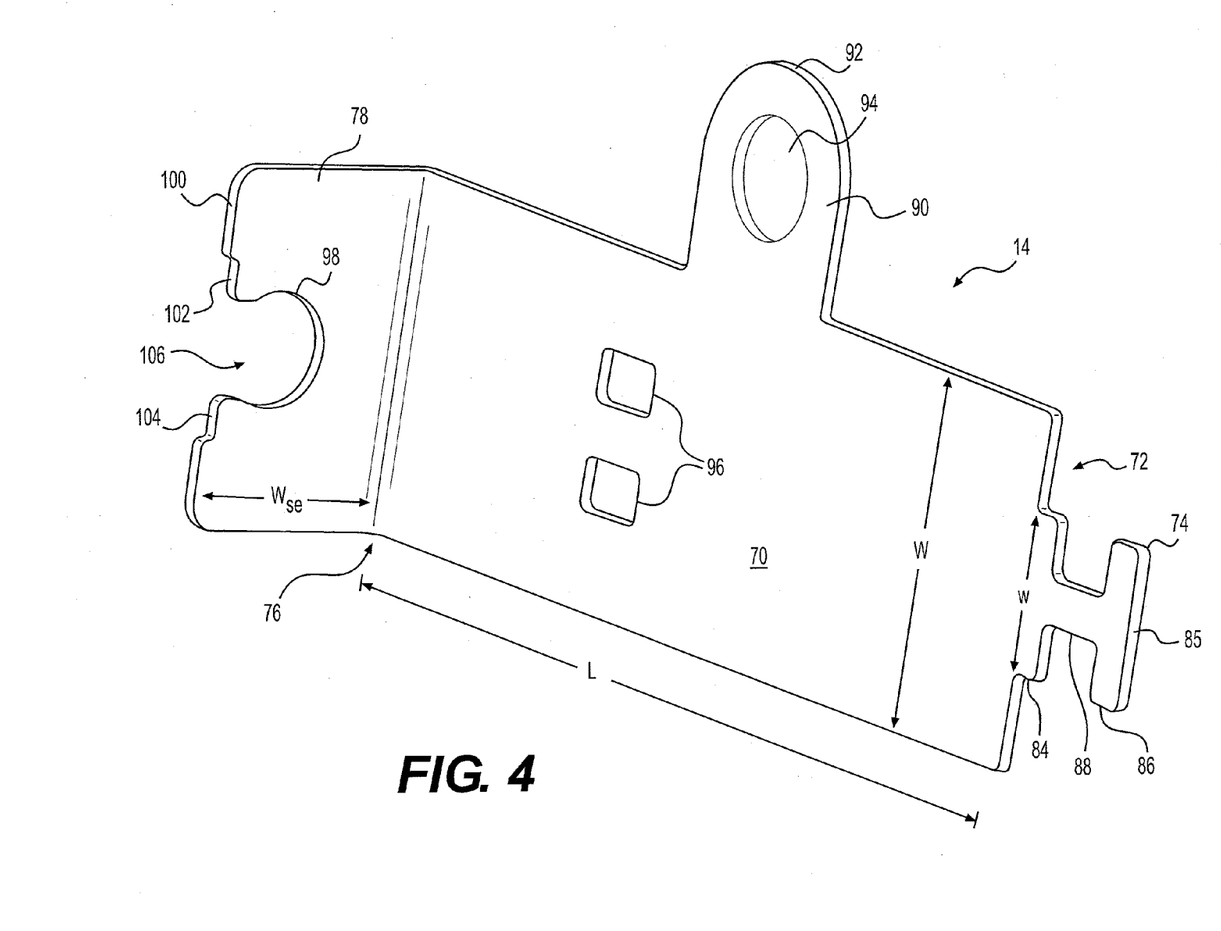
FIG. 4 is a perspective view of another component of an exemplary connector guard.

FIG. 4 is a perspective view of second member 14 that is shown deployed in assembly 16 of FIG. 1. Referring to FIG. 4, second member 14 includes a planar base element 70. At a first end 72 of planar base element 70, an end tab 74 may be coextensive with planar base element 70 and protrude from first end 72 to a terminal edge 85. End tab 74, like T-shaped end tab 34, may be referred to as a T-shaped end tab 74 and may look somewhat less like a "T" than illustrated while conforming to the disclosed shape and profile. A second end 76 of planar base element 70 may include an end element 78. End element 78 may extend substantially perpendicularly from planar base element 70. Considering the overall shape of second member 14 as illustrated in FIG. 4, it can be observed that planar base element 70 and end element 78 may be compatible with the open area opposite planar base element 30 and open area opposite end element 38 described and illustrated in connection with first member 12. As described subsequently, this may facilitate the mating engagement of first member 12 and second member 14 to form a completed enclosure for a connection in the completed connector guard assembly 16.

Figure 5:
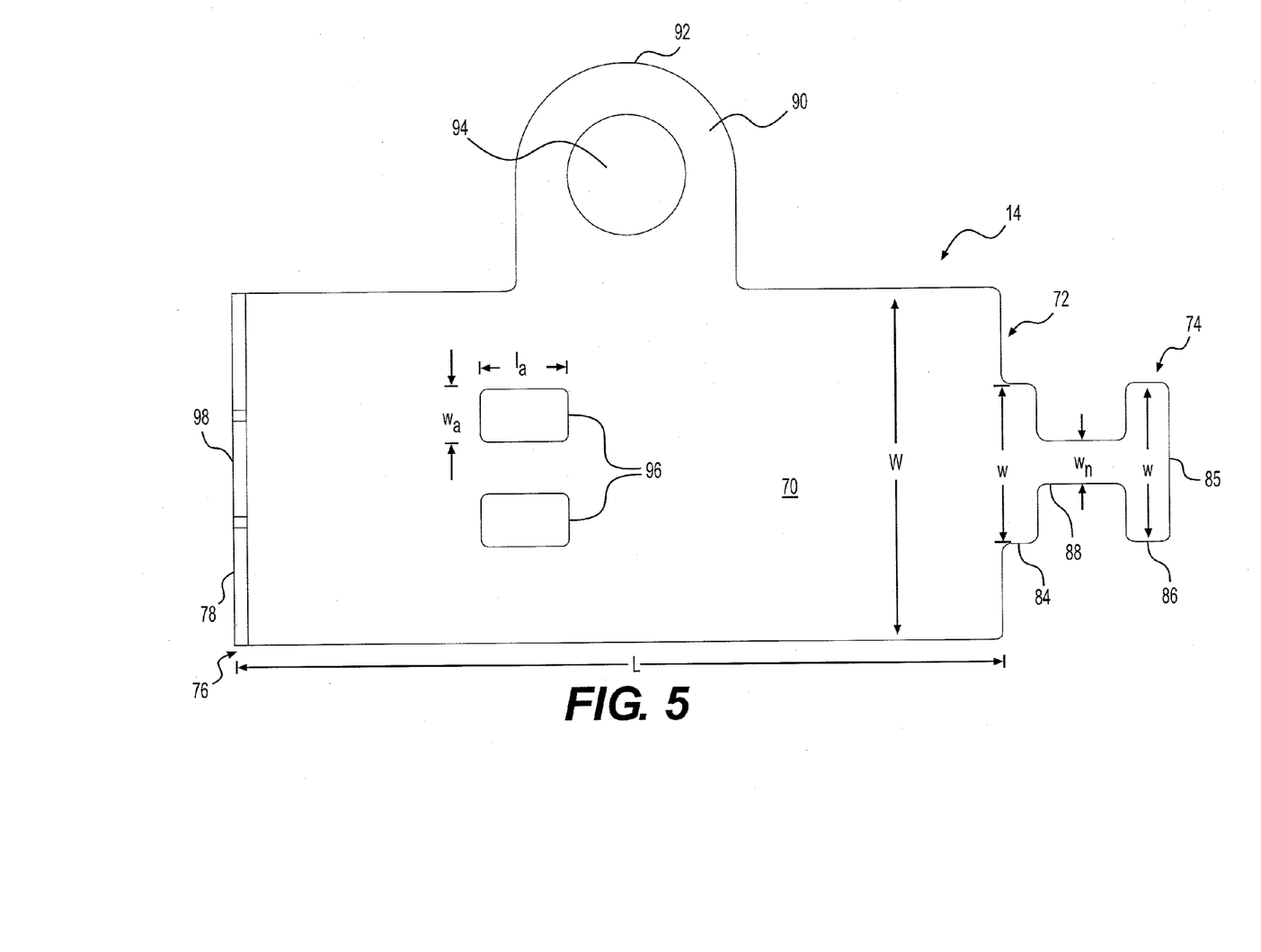
FIG. 5 is a bottom plan view of the component of FIG. 4.

Referring both to FIG. 4 and FIG. 5, T-shaped end tab 74 may have a particular shape or profile that includes several connected portions similar to those portions described previously in connection with T-shaped end tab 34 of first member 12. For example, T-shaped end tab 74 may include a first portion 84 contiguous to planar base element 70 and having a second width w. T-shaped end tab 74 also may include an end portion 86, substantially equal in width w to first portion 84. T-shaped end tab 74 also may include a middle portion 88 between first portion 84 and end portion 86. Middle portion 88 may be narrower than first portion 84 and end portion 86. While width w is designated "first" and "second" in reference to portions of T-shaped end tabs 34, 74, it should be understood that second width w of first portion 84 of T-shaped end tab 74 may be substantially equal to first width w of first portion 44 of T-shaped end tab 34.

Second member 14 may include a side tab 90 that may be coextensive with planar base element 70 and that may protrude from planar base element 70. Side tab 90 may be centered at a midpoint along the length L of planar base element 70. Side tab 90 may be similar to side tab 50 of first member 12 and may include a rounded outer edge 92, and may define an aperture 94 that extends therethrough. It is contemplated that, in some embodiments, side tab 90, similar to side tab 50 described in connection with first member 12, may be centered somewhat offset from a midpoint along the length L of planar base element 70.

Second member 14 may include a plurality of apertures 96 defined by planar base element 70 and extending therethrough. For example, as illustrated in FIGS. 4 and 5, planar base element 70 may include two apertures 96. Apertures 96 may be substantially rectangular in shape and may be located adjacent each other and offset from a midpoint along the length L of planar base element 70. As illustrated in FIGS. 4 and 5, apertures 96 may be offset from a midpoint along the length L of planar base element 70 in a direction toward end element 78.

End element 78 of second member 14 may include a rounded slot 98. Rounded slot 98 may be substantially circular in profile, but it also may be elliptical, oval, or otherwise curved. Rounded slot 98 may be substantially centrally located on an edge 100 of end element 78. Relieved portions 102, 104 may be located on edge 100 and adjacent entrance 106 of rounded slot 98. Rounded slot 98 may have a profile and shape that is similar to rounded slot 58 in end element 38 of first member 12.

Connector guard assembly 16 may be sized and dimensioned in accordance with the size of a particular connection and associated cables with which it may be employed. First member 12 and second member 14 may be sized and dimensioned so that they may be engaged in mating relationship to effectively form an enclosure for a connection between two cables, for example. In an exemplary embodiment, the length L for planar base element 30 of first member 12 and planar base element 70 of second member 14 may be approximately 86 mm, and the width W for planar base elements 30, 70 may be approximately 40 mm. More generally, it is contemplated that the length L to width W ratio of planar base elements 30 and 70 may be greater than 2. Side elements 40, 42 and end elements 38, 78 may have widths $w_{se}$ within the range of 25-27 mm. Side tabs 50, 90 may laterally protrude from respective first and second members 12, 14 a distance within the range of 26-30 mm. As described above, apertures 56, 96 may be substantially rectangular, and they may have a width $w_a$ of approximately 6 mm and a length $l_a$ of approximately 10 mm. In addition, as can be observed by reference to FIGS. 1-5, apertures 56, 96 may have rounded corners within their substantially rectangular outlines.

T-shaped end tabs 34, 74 may be substantially identical in shape and dimensions, and in an exemplary embodiment, may protrude from respective main body elements 30, 70 a distance within the range of 18-20 mm. First portion 44, 84 may have a width w of approximately 18 mm and protrude from planar base element 30, 70 a distance of approximately 4 mm. Middle portion 48, 88, from its juncture with first portion 44, 84, may protrude a distance of approximately 10 mm to its juncture with end portion 46, 86, and may have a width $w_n$ of approximately 5 mm. End portion 46, 86 may protrude from its juncture with middle portion 48, 88 a distance of approximately 5 mm to the terminal edge 45, 85 of T-shaped end tabs 34, 74. End portion 46, 86 may have a width w that, as previously described, may be substantially equal to the width w of first portion 44, 84, i.e., approximately 18 mm.

Rounded slots 58, 98 located on end elements 38, 78, respectively, may be substantially identical in shape and dimensions. In an exemplary embodiment, rounded slots 58, 98 may have a radius between about 5 mm and 8 mm. Rounded slots 58, 98 may be centered approximately 8 mm from edge 60, 100 of end element 38, 78. Relieved portions 62, 64 located on edge 60 adjacent entrance 66 of rounded slot 58, and relieved portions 102, 104 located on edge 100 adjacent entrance 106 of rounded slot 98 may be dimensioned to mate with the first portion 44, 84 of T-shaped end tab 34, 74 of the mating first and second members 12, 14. Accordingly, the relieved portions 62, 64 of first member 12, and the relieved portions 102, 104 of second member 14, may form a notched portion on edge 60, 100 adjacent entrance 66, 106 to rounded slot 58, 98 that has a total width of approximately 18-18.5 mm. Notwithstanding the foregoing exemplary embodiment in which rounded slots 58, 98 may be substantially identical in shape and dimensions, it is contemplated that in some situations, e.g., where a cable of one size is to be connected to a cable of a different size, it may be desirable and/or beneficial to employ first and second members 12, 14 with rounded slots of differing sizes to accommodate the different sized cables.

First and second members 12, 14 of connector guard assembly 16 may be manufactured from various materials. For example, it is contemplated that first and second members 12, 14 may be made from metal having a thickness of approximately 1.5 mm. It also is contemplated that, in some instances where greater connector protection is indicated, first and second members 12, 14 may be made of metal that is thicker than 1.5 mm. Various metals and/or metal alloys may be employed, depending on cost, availability of the metal or alloy, the particular environment of use, etc. For example, various ferrous metal alloys normally employed for sheet metal may be employed in many circumstances with adequate connector protection. In addition, it is contemplated that some situations may be amenable to forming first and second members 12, 14 from materials other than metal. For example abrasion and impact resistant polymeric and/or composite materials may be suitable for some applications.

INDUSTRIAL APPLICABILITY

The disclosed connector guard may provide protection for connections on various machines such as, for example, mining machines, excavators, and haulage machine. Machines employed in the mining, excavating, handling, and moving of ore, rocks, earth, debris, and other materials often include numerous connections, such as electrical connections, that are subject to contamination and mechanical injury. These connections also may require protection from high pressure fluid jets often employed to clean such machines. The disclosed connector guard assembly may be relatively inexpensive to manufacture, may be installed and serviced about a connection with little difficulty in the field, and may provide protection for connections against the above mentioned contamination and high pressure fluid jets.

In addition to the protective advantages offered by the mechanical simplicity and robustness of the disclosed connector guard, it also may offer the additional advantages of ease of serviceability and reusability. Since no ancillary sealants are employed, the connector guard assembly can readily be opened and removed in the event the enclosed connection requires servicing. Once an installed connector guard assembly is opened and removed from a connection, it readily may be reused, either to enclosed the same connection again, or to enclose a different connection. The reusability and serviceability of the disclosed connector guard assembly offer both cost and environmental advantages.

In use, and as an example, one cable may be connected to another cable, and the connection may include any of various connectors known in the art. Referring again to FIG. 1, once the connection 18 is made via any of various known connectors, a first member 12 of a connector guard assembly 16 may be installed adjacent the connection with the connection and the connector positioned somewhat centrally relative to the planar base element 30 of first member 12. A first cable 20 of the two connected cables may be seated within rounded slot 58 (see FIG. 2) on end element 38 of first member 12, and a second cable 22 of the two connected cables may be positioned adjacent T-shaped end tab 34 of first member 12. In this position, first member 12 may form a partial enclosure for connection 18.

Once first member 12 is positioned relative to the cable connection as described above, a suitable flexible tie member 110 may be threaded through the two apertures 56 in planar base element 30 of first member 12, and the ends of flexible tie member 110 may be joined to securely hold the cable connection to first member 12. The particular flexible tie member employed may be selected from any of a number of conventional flexible tie members that may be employed for securing cables, hoses, and other members in position. After that, a suitable flexible tie member 112 may be employed to secure second cable 22 of the two connected cables to T-shaped end tab 34 adjacent narrow middle portion 48 of T-shaped end tab 34.

At this point, second member 14 of connector guard assembly 16 may be moved into position adjacent the cable connection until it is in mating engagement with first member 12. Planar base element 70 and end element 78 of second member 14 may be compatible with the open areas opposite planar base element 30 and end element 38 of first member 12. As a result, the partial enclosure for connection 18 formed by first member 12 may become a completed substantially rectangular enclosure when second member 14 is moved into position. Rounded slot 98 (not seen in FIG. 1, but visible in FIG. 4) on end element 78 of second member 14 may be seated against second cable 22 of the two connected cables, and T-shaped end tab 74 of the second member 14 may be positioned adjacent first cable 20 of the two connected cables.

A suitable flexible tie member 114 may be employed to secure first cable 20 of the two connected cables to T-shaped end tab 74 adjacent narrow middle portion 88 of T-shaped end tab 74. A final portion of the assembly process may include installing a suitable fastener 120 through aligned apertures 54, 94 of the overlying side tabs 50, 90 of first and second members 12, 14 and into a machine part adjacent the location of the connection in order to securely hold the completed connector guard assembly 16 in place.

Connector guard assembly 16 may be characterized as reversible. To that end, it also is contemplated that either of the first and second members 12, 14 may be employed to begin the assembly. That is to say, second member 14 may be positioned adjacent the connection first, and first member 12 may then be positioned to complete the assembly. Accordingly, a second member 14 of a connector guard assembly 16 may be installed adjacent the connection with the connection and the connector positioned somewhat centrally relative to the planar base element 70 of second member 14. A cable 22 of the two connected cables may be seated within rounded slot 98 (see FIG. 4) on end element 78 of second member 14, and a cable 20 of the two connected cables may be positioned adjacent T-shaped end tab 74 of second member 14.

Once second member 14 is positioned relative to the cable connection as described above, a suitable flexible tie member 110 may be threaded through the two apertures 96 (FIGS. 4 and 5) in planar base element 70 of second member 14, and the ends of flexible tie member 110 may be joined to securely hold the cable connection to second member 14. To reiterate, the particular flexible tie member employed may be selected from any of a number of conventional flexible tie members that may be employed for securing cables, hoses, and other members in position. After that, a suitable flexible tie member 114 may be employed to secure cable 20 of the two connected cables to T-shaped end tab 74 adjacent narrow middle portion 88 of T-shaped end tab 74.

At this point, first member 12 of connector guard assembly 16 may be moved into position adjacent the cable connection until it is in mating engagement with second member 14. A completed substantially rectangular enclosure may be formed when first member 12 is moved into position. Rounded slot 58 (more visible in FIG. 2) on end element 38 of first member 12 may be seated against cable 20 of the two connected cables, and T-shaped end tab 34 of the first member 12 may be positioned adjacent cable 22 of the two connected cables.

A suitable flexible tie member 112 may be employed to secure second cable 22 of the two connected cables to T-shaped end tab 34 adjacent narrow middle portion 48 of T-shaped end tab 34. A final portion of the assembly process may include installing a suitable fastener 120 through aligned apertures 54, 94 of the overlying side tabs 50, 90 of first and second members 12, 14 and into a machine part adjacent the location of the connection in order to securely hold the completed connector guard assembly 16 in place.

It is contemplated that the connector guard assembly may be deployed in a manner different from that described above. For example, since the apertures in the planar base element of the first member are offset from the apertures of the planar base element of the second member along the lengths of the first and second members when the first and second members are assembled, one flexible tie member may be employed to secure the cable connection to the first member 12, and a second flexible tie member may be employed to secure the cable connection to the second member 14. This may provide a more robust connection to keep the connector guard assembly secured to the cable connection, particularly in combination with the flexible tie members employed to secure the two cables to the T-shaped end tabs adjacent the location where the cable is seated in the rounded slots on the mating members of the connector guard assembly 16.

Advantageously, the disclosed cable guard may be available as a kit that includes at least the first and second members. Accordingly, the first and second members 12, 14 may be made available together in a suitable package or container. Since cables and other components may come in various sizes, the disclosed connector guard and assembly also may come in various sizes suitably dimensioned to be deployed at a connection with a snug fit relative to the particular cables that are connected. The kit package or container may indicate the particular size and/or dimensions to enable a user to readily identify an appropriate connector guard assembly for a given situation. It also is contemplated that the size and/or shape of rounded slot 58 of first member 12 may be the same size and/or shape as rounded slot 98 of second member 14. Alternatively, rounded slots 58, 98 may be of differing size and/or shape, depending on the size and/or shape of the first and second cables 20, 22 that are to be connected. Such a kit also may include other items/components that may be used with the assembly such as suitably sized flexible tie members (e.g., 110, 112, 114) and/or fasteners (e.g., 120) or other components for securing the assembly to a machine.

For this disclosure, "planar," e.g., as used in planar base element, planar side element, and planar end element, is intended to allow for manufacturing tolerances, and therefore these terms may include elements that may vary from a strict geometric definition of planar by normal manufacturing tolerances. Also, "substantially," e.g., substantially perpendicular, substantially parallel, etc., is intended to allow for manufacturing tolerances, and therefore these terms may include elements that may vary from strictly perpendicular, parallel, etc., by normal manufacturing tolerances.

It will be apparent to those skilled in the art that various modifications and variations can be made in the disclosed connector guard and assembly without departing from the scope of the disclosure. Other embodiments of the disclosed connector guard and assembly will be apparent to those skilled in the art from consideration of the specification. It is intended that the specification and examples be considered as exemplary only, with a true scope of the disclosure being indicated by the following claims and their equivalents.

What is claimed is:

1. A connector guard, comprising:
a first member including a planar base element, a planar end element extending substantially perpendicularly from a first end of the planar base element, an end tab coextensive with the planar base element and protruding from a second end of the planar base element, two planar side elements extending substantially perpendicularly from the planar base element of the first member, and a side tab protruding substantially perpendicularly from an edge of one of the two planar side elements, the side tab defining an aperture therethrough; and
a second member including a planar base element, a planar end element extending substantially perpendicularly from a first end of the planar base element of the second member, an end tab coextensive with the planar base element of the second member and protruding from a second end of the planar base element of the second member, and a side tab protruding from and coextensive with the planar base element of the second member, the side tab of the second member defining an aperture therethrough.

2. The connector guard of claim 1, including a rounded slot on the planar end element of the first member, and a rounded slot on the planar end element of the second member.

3. The connector guard of claim 1, wherein the end tab of the first member includes a first portion contiguous to the planar base element of the first member and having a first width, a middle portion narrower than the first portion, and an end portion substantially equal in width to the first portion of the end tab of the first member, and the end tab of the second member includes a first portion contiguous to the planar base element of the second member and having a second width, a middle portion narrower than the first portion, and an end portion substantially equal in width to the first portion of the end tab of the second member.

4. The connector guard of claim 1, wherein the planar base elements of the first and second members each define at least two substantially rectangular apertures therethrough.

5. The connector guard of claim 1, wherein the planar base elements of the first and second members each are substantially rectangular with a length to width ratio greater than 2.

6. The connector guard of claim 1, wherein each of the first and second members is formed of metal, and wherein the metal of each of the first and second members is approximately 1.5 mm in thickness.

7. A connector guard assembly, comprising:
a first member, including:
a first end and a second end;
a T-shaped end tab at the first end of the first member;
an end element at the second end of the first member;
a rounded slot on the end element of the first member; and
two side elements substantially perpendicular to the end element; and
a second member, including:
a first end and a second end;
a T-shaped end tab at the first end of the second member;
an end element at the second end of the second member; and
a rounded slot on the end element of the second member;
wherein the first member is engaged with the second member, and the T-shaped end tab of the first member is adjacent the rounded slot of the second member, and the T-shaped end tab of the second member is adjacent the rounded slot of the first member.

8. The assembly of claim 7, including a side tab protruding laterally from the second member and defining an aperture therethrough, and a side tab protruding laterally from one of the two side elements of the first member and defining an aperture therethrough, and wherein the aperture defined by the tab of the second member is aligned with the aperture defined by the tab of the first member.

9. The assembly of claim 7, wherein the first member includes a planar base element, and the two side elements and the end element of the first member are each substantially perpendicular to the planar base element of the first member.

10. The assembly of claim 9, wherein the second member includes a planar base element, and the end element of the second member is substantially perpendicular to the planar base element of the second member.

11. The assembly of claim 10, wherein the engaged first and second members form a substantially rectangular enclosure for a connection between two electrical cables.

12. The assembly of claim 11, wherein a first of the two electrical cables is seated in the rounded slot of the first member, and a second of the two electrical cables is seated in the rounded slot of the second member.

13. The assembly of claim 12, wherein the T-shaped end tab of the first member is adjacent the second cable, and the T-shaped end tab of the second member is adjacent the first cable.

14. The assembly of claim 11, wherein the first and second members each include a plurality of substantially rectangular apertures defined by the planar base elements, and the plurality of substantially rectangular apertures of the first member are offset along a lengths of the first and second members from the plurality of substantially rectangular apertures of the second member.

15. The assembly of claim 7, wherein the T-shaped end tabs of each of the first and second members include a first portion contiguous with a planar base element and having a width, an end portion at least as wide as the width of the first portion, and a middle portion having a width less than the first portion and the end portion.

16. The assembly of claim 15, wherein the end elements of each of the first and second members include a relieved portion on an edge of the end elements adjacent an opening of the rounded slot, and wherein a total width of the relieved portion is substantially equal to the width of the first portion of each of the T-shaped end tabs.

17. The assembly of claim 7, wherein the assembly is substantially rectangular with a length to width ratio greater than 2.

18. The assembly of claim 7, wherein each of the first and second members is formed of metal, and wherein the metal of each of the first and second members is approximately 1.5 mm in thickness.

19. A connector guard, comprising:
- a first member including a planar base element, a planar end element extending substantially perpendicularly from a first end of the planar base element, an end tab coextensive with the planar base element and protruding from a second end of the planar base element, two planar side elements extending substantially perpendicularly from the planar base element of the first member; and
- a second member including a planar base element, a planar end element extending substantially perpendicularly from a first end of the planar base element of the second member, an end tab coextensive with the planar base element of the second member and protruding from a second end of the planar base element of the second member;
- wherein the end tab of the first member includes a first portion contiguous to the planar base element of the first member and having a first width, a middle portion narrower than the first portion, and an end portion substantially equal in width to the first portion of the end tab of the first member, and the end tab of the second member includes a first portion contiguous to the planar base element of the second member and having a second width, a middle portion narrower than the first portion of the end tab of the second member, and an end portion substantially equal in width to the first portion of the end tab of the second member.

20. The connector guard of claim 19, including a rounded slot on the planar end element of the first member, and a rounded slot on the planar end element of the second member.

* * * * *